B. F. ROBERTS.
Skeleton-Kettle.
No. 224,956. Patented Feb. 24, 1880.
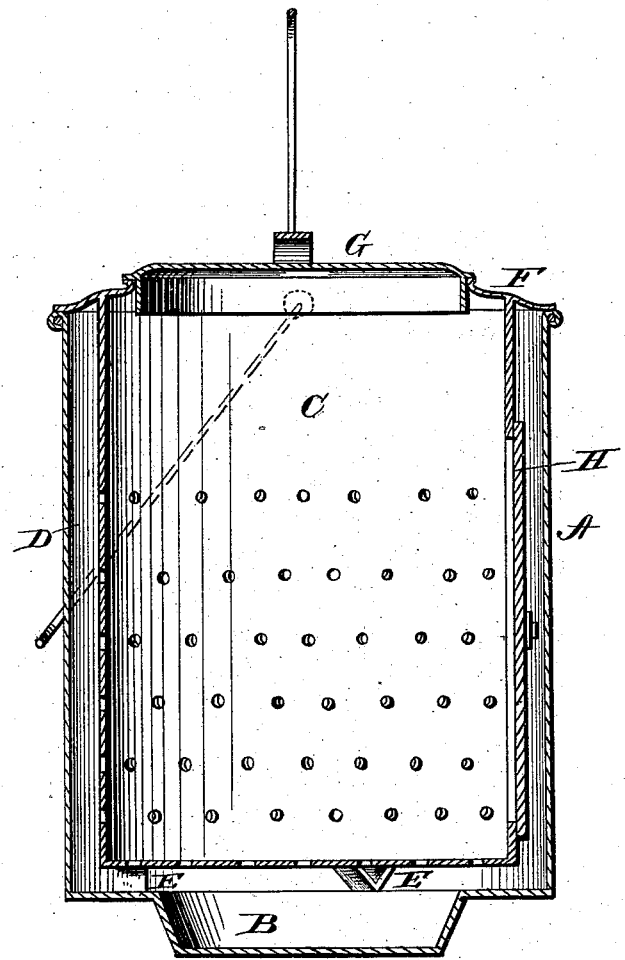

UNITED STATES PATENT OFFICE.

BENJAMIN F. ROBERTS, OF LEON, IOWA.

SKELETON-KETTLE.

SPECIFICATION forming part of Letters Patent No. 224,956, dated February 24, 1880.

Application filed December 9, 1879.

*To all whom it may concern:*

Be it known that I, B. F. ROBERTS, of Leon, in the county of Decatur and State of Iowa, have invented certain new and useful Improvements in Skeleton - Kettles; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

This invention relates to certain improvements in that class of domestic boilers in which a perforated inner vessel is employed in connection with an exterior vessel, the inner vessel containing the articles to be boiled, and being removable, so that such articles may be removed in a body from the exterior vessel; and it has for its object to provide for more readily inserting and removing the articles from the interior vessel and securing the said interior vessel in the exterior vessel so as to form a tight joint, as more fully hereinafter specified.

The drawing represents a vertical sectional view of my improved boiler, in which—

The letter A indicates a metallic vessel of cylindrical or other shape, having a well, B, at the bottom, which projects through the stove-aperture when the boiler is in use, to facilitate the heating of the contents.

The letter C indicates a perforated or foraminous vessel adapted to fit within the vessel A so as to leave a continuous space, D, between the two. The bottom of the vessel C is provided with a series of legs, E, which rest upon the bottom of the vessel A and hold the vessel C away from the same.

The vessel C is provided with an annular rim, F, at its upper edge, which is adapted to fit upon the upper edge of the vessel A, making a tight joint with the same. The said vessel C is provided with a removable cover, G, and a door, H, for the removal and insertion of the contents.

The improved apparatus is particularly designed for boiling and steaming articles of food, such as potatoes, puddings, dumplings, eggs, and other like articles which require to be removed whole after cooking; but it may be used for boiling clothes and other articles, in order to avoid unnecessary handling.

In operation the articles to be boiled or steamed are inserted at the top of the vessel C and the cover secured thereon. The said vessel is then inserted in the vessel A and the same placed upon a stove or over a fire and the contents boiled the proper length of time, after which the vessel C can be removed with its contents entire. As the contents do not come in contact with the bottom or sides of the vessel, it is evident that no injury can be sustained by burning, which is an obvious advantage.

Having thus fully described my invention, what I claim, and desire to secure by Letters Patent, is—

In combination with the vessel A, the inner perforated vessel, C, provided with legs E at its bottom, and having a removable cover, G, at its top, and a door, H, at its side, and an annular rim at its upper edge, adapted to fit upon the upper edge of the vessel A, the whole adapted to operate substantially as and for the purposes herein specified.

In testimony that I claim the foregoing I hereunto set my hand this 20th day of October, 1879.

BENJAMIN F. ROBERTS.

Witnesses:
J. B. NEWLIN,
THOS. TEALE.